Jan. 23, 1945. G. MAKAROFF 2,368,033
HYDRAULIC MOTOR
Filed Jan. 14, 1943 2 Sheets-Sheet 2
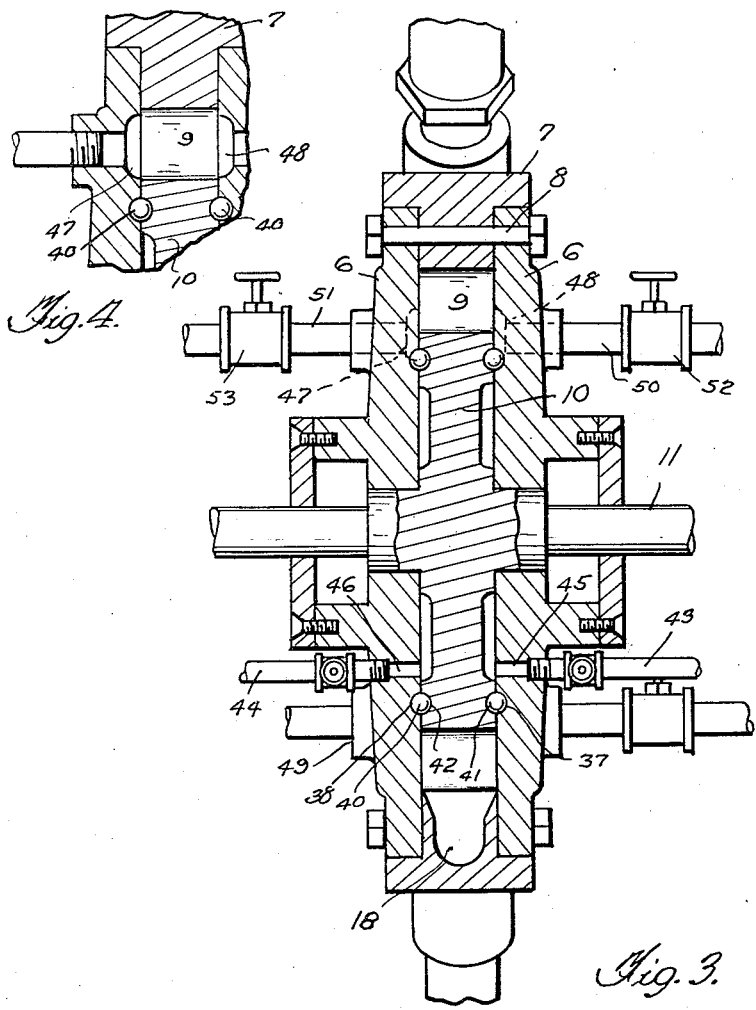
Inventor
GREGORY MAKAROFF,
By Clarence A. O'Brien
and Harvey B. Jacobson
Attorneys Patented Jan. 23, 1945

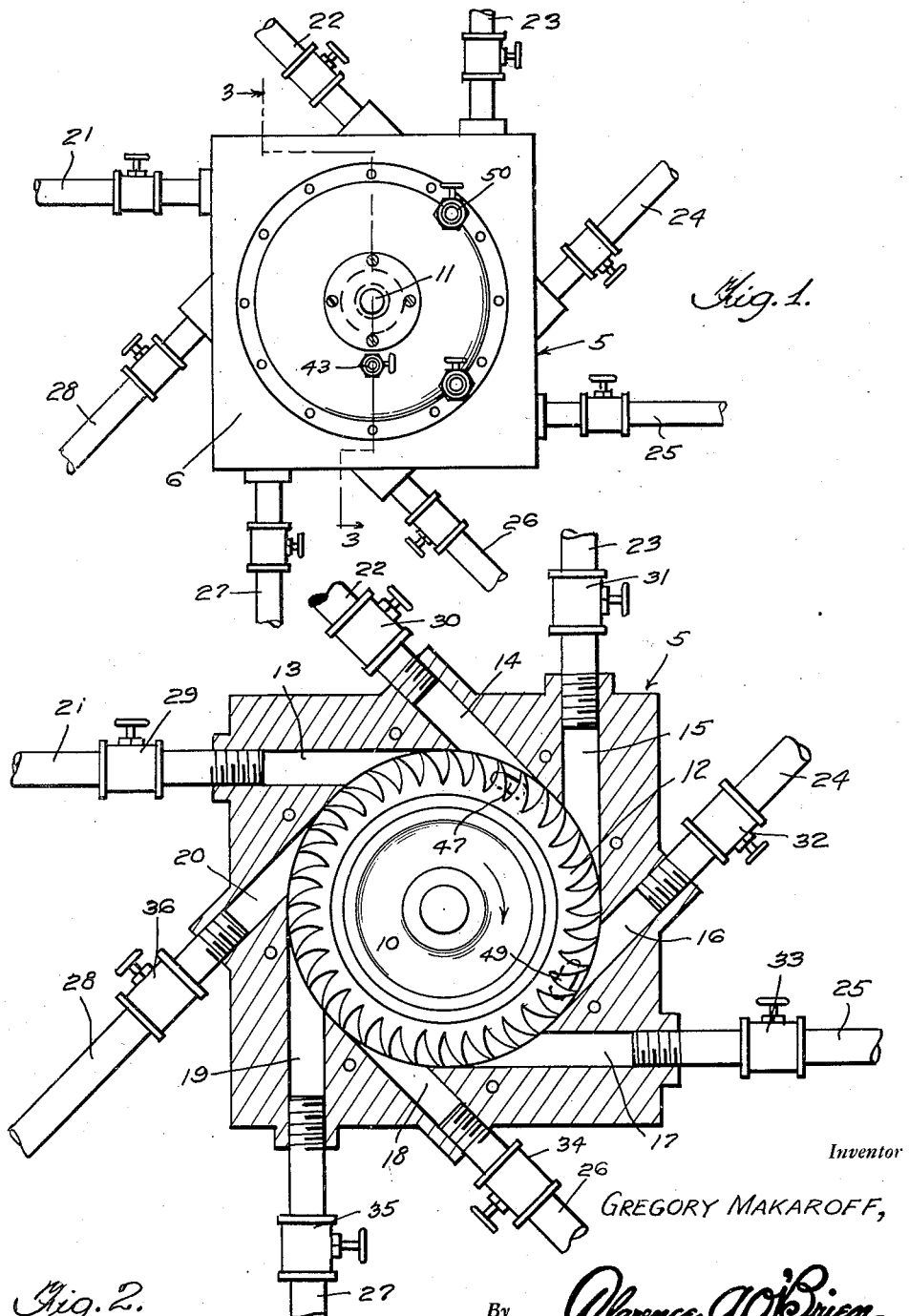

2,368,033

UNITED STATES PATENT OFFICE 2,368,033

HYDRAULIC MOTOR

Gregory Makaroff, Lanesboro, Mass.

Application January 14, 1943, Serial No. 472,376

2 Claims. (Cl. 253—56)

The present invention relates to new and useful improvements in hydraulic motors and has for its primary object to subject a rotor or turbine to fluid under pressure in a manner to maintain a constant pressure on the rotor, and to regulate the discharge or release of pressure in accordance with a desired speed of the rotor.

A further object is to provide a hydraulic motor of simple and practical construction which promotes economy in the volume of liquid employed for driving the same while at the same time increasing the driving force of the motor and which is relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 1 is a side elevational view of the motor.

Figure 2 is a sectional view through the motor taken transversely of the axis of the rotor.

Figure 3 is a sectional view taken substantially on a line 3—3 of Figure 1, and

Figure 4 is a fragmentary sectional view of the plates showing one of the release recesses or pockets.

Referring now to the drawings in detail, the numeral 5 designates the motor casing which is composed of a pair of side plates 6 connected at their peripheral edges to a frame 7 by means of bolts 8, the plates being secured in spaced relation to form the chamber 9 therebetween.

Positioned between the plates 6 is the rotor or turbine 10 secured on a shaft 11 journaled in the plates, the rotor having a liquid tight fit in the chamber 9. The peripheral edge of the rotor is formed with the arcuate blades 12.

A plurality of tangentially disposed ports 13, 14, 15, 16, 17, 18, 19 and 20 communicate with the chamber 9 through the frame 7 and to which are connected pipes 21, 22, 23, 24, 25, 26, 27 and 28 respectively. The pipes 13, 14 and 15 constitute inlet pipes adapted for attaching to a suitable supply of liquid under pressure, while the pipes 16 and 17 constitute combined inlet and discharge pipes for selective use for either supplying liquid under pressure to the chamber or for discharging liquid therefrom, and the pipes 18, 19 and 20 constitute discharge pipes. The pipes are each provided with conventional manually controlled valves 29, 30, 31, 32, 33, 34, 35 and 36, respectively.

All of the ports enter the chamber 9 at the peripheral edge thereof in a rearwardly inclined direction with respect to the direction of rotation of the rotor.

The opposed surfaces of the plates 6 are formed with annular grooves 37 and 38 within which ball bearings 39 and 40 are positioned, the adjacent faces of the rotor 10 likewise having grooves 41 and 42 therein to receive the ball bearings. To each of the plates 6 is attached a drain pipe 43 and 44 communicating with the chamber 9 through ports 45 and 46 at points radially inwardly from the ball bearings.

The opposed surfaces of the plates 6 are also formed with elongated recesses or pockets 47 and 48 disposed in the chamber 9 at the sides of the blades 12 and at a point adjacent the inner end of the port 14. Similar recesses or pockets 49 may be formed adjacent the inner end of the port 16 or adjacent any of the other inlet ports. Pipes 50 and 51 are connected respectively with these recesses with valves 52 and 53 therein, the pipes projecting from the plates 6.

In the operation of the motor, fluid is admitted into the chamber 9 by means of one or more of the inlet pipes so as to fill all the spaces between the blades 12 of the rotor, the fluid being placed under a predetermined pressure and controlled by the valves of the inlet pipes. Discharge of the fluid is obtained through one or more of the discharge pipes under control of the valves therein. Release of pressure of the fluid in the chamber 9 is obtained by means of the recesses or pockets 47 and 48 under control of the valves 52 and 53, such pressure being released immediately following action of the fluid on the rotor at points adjacent the inlet ports, and it will be understood each of the inlet ports may be provided with such recesses or pockets with discharge pipes connected thereto to release a desired amount of fluid after its work has been accomplished.

It is believed the details of construction, advantages and manner of use of the device will be readily understood from the foregoing without further detailed explanation.

Having described the invention what is claimed as new is:

1. A hydraulic motor comprising a casing having a chamber therein, a rotor having blades on the peripheral edge operatively mounted in the chamber, a plurality of ports communicating with the chamber and including an inlet port and a discharge port and elongated recesses in the wall of the chamber having valved controlled outlets, said recesses being disposed adjacent the inlet port and adapted to release pressure of fluid subjected to the rotor immediately following contact therewith.

2. A hydraulic motor comprising a casing having a chamber therein, a rotor having blades on the peripheral edge operatively mounted in the chamber, a plurality of ports communicating with the chamber and including a plurality of inlet ports grouped at one side of the rotor and a plurality of discharge ports grouped at another opposite side of the rotor and elongated recesses in the wall of the chamber having valved controled outlets, said recesses being disposed adjacent the inlet port and adapted to release pressure of fluid subjected to the rotor immediately following contact therewith.

GREGORY MAKAROFF.